United States Patent
Shaw et al.

(10) Patent No.: US 12,252,124 B2
(45) Date of Patent: Mar. 18, 2025

(54) VEHICLE MAINTENANCE PREVENTION

(71) Applicants: Hyundai Motor Company, Seoul (KR); Kia Corporation, Seoul (KR)

(72) Inventors: Susan Shaw, Plymouth, MI (US); Javier Romero, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 266 days.

(21) Appl. No.: 18/153,110

(22) Filed: Jan. 11, 2023

(65) Prior Publication Data

US 2024/0227804 A1 Jul. 11, 2024

(51) Int. Cl.
| | |
|---|---|
| *G06F 17/00* | (2019.01) |
| *B60C 23/04* | (2006.01) |
| *B60W 10/04* | (2006.01) |
| *B60W 30/18* | (2012.01) |
| *B60W 40/02* | (2006.01) |

(52) U.S. Cl.
CPC ....... *B60W 30/18009* (2013.01); *B60C 23/04* (2013.01); *B60W 10/04* (2013.01); *B60W 40/02* (2013.01); *B60W 2510/244* (2013.01); *B60W 2530/20* (2013.01); *B60W 2554/80* (2020.02)

(58) Field of Classification Search
CPC .......... B60W 30/18009; B60W 10/04; B60W 40/02; B60W 2510/244; B60W 2530/20; B60W 2554/80; B60C 23/04
USPC ....................................................... 701/29.1
See application file for complete search history.

(56) References Cited

U.S. PATENT DOCUMENTS

| | | | |
|---|---|---|---|
| 8,491,238 B2 | 7/2013 | Winsor | |
| 2012/0298268 A1 | 11/2012 | Igarashi et al. | |
| 2018/0056988 A1* | 3/2018 | Heil, Jr. ................ | B60W 10/10 |
| 2018/0319402 A1* | 11/2018 | Mills ..................... | B60W 10/04 |
| 2022/0055430 A1* | 2/2022 | Delizo ................... | B60K 35/10 |
| 2022/0063593 A1* | 3/2022 | Fukuda ................. | B60W 20/40 |
| 2022/0219498 A1* | 7/2022 | Agarwal ............. | B60C 23/0479 |

FOREIGN PATENT DOCUMENTS

WO 2016-009347 A1 1/2016

* cited by examiner

*Primary Examiner* — Adam M Queler
*Assistant Examiner* — Matthew J Ludwig
(74) *Attorney, Agent, or Firm* — Fox Rothschild LLP

(57) ABSTRACT

A system is provided. The system comprises an engine configured to power a vehicle, a distance sensor configured to measure one or more distances surrounding the vehicle, a tire pressure sensor, and a controller configured to detect whether the engine is shut off, determine whether the tire pressure satisfies a tire pressure threshold based on the tire pressure sensor, the tire pressure threshold being indicative of a decrease in the tire pressure, determine whether a distance satisfies a distance threshold based on the distance sensor, the distance threshold being indicative of the vehicle having space to advance the distance in one or more of: a forward direction; and a backward direction, and when the tire pressure satisfies the tire pressure threshold, the distance satisfies the distance threshold, and the engine is shut off, operate the engine to turn on and operate the vehicle to move the distance.

20 Claims, 4 Drawing Sheets

VEHICLE MAINTENANCE PREVENTION

BACKGROUND

Technical Field

Embodiments of the present disclosure relate to systems and methods for providing preventative maintenance on vehicles and, in particular, for providing preventative maintenance on vehicles to prevent damage that occurs from prolonged sitting.

Background

Prolonged sitting, wherein a vehicle is not being used for a long time, can be harmful to the vehicle and can lead to expensive maintenance. In particular, preventing flat spots is a knows problem but no current solution exists that does not require prior thought or intervention. Current solutions require the vehicle owner to plan ahead, to have a device placed under the tires to prevent flat spots, which only addresses one problem, and the user has to remember to put them under each wheel. Other current solutions include shifting the vehicle, using a force, to a new position until the flat spot is removed, which only addresses the one concern, and arranging for someone to drive the vehicle while the owner is away, which requires trusting someone else with your vehicle and that they will remember.

SUMMARY

According to an object of the present disclosure, a system is provided. The system may comprise an engine configured to power a vehicle, a distance sensor configured to measure one or more distances surrounding the vehicle, a tire pressure sensor configured to sense a tire pressure of one or more tires of the vehicle, and a controller, communicatively coupled to the engine, the distance sensor, and the tire pressure sensor. The controller may be configured to detect whether the engine is shut off, determine whether the tire pressure satisfies a tire pressure threshold based on the tire pressure sensor, the tire pressure threshold being indicative of a decrease in the tire pressure, determine whether a distance satisfies a distance threshold based on the distance sensor, the distance threshold being indicative of the vehicle having space to advance the distance in one or more of: a forward direction; and a backward direction, and when the tire pressure satisfies the tire pressure threshold, the distance satisfies the distance threshold, and the engine is shut off, operate the engine to turn on and operate the vehicle to move the distance.

According to an exemplary embodiment, the controller may be further configured to, when the tire pressure satisfies the tire pressure threshold, the distance satisfies the distance threshold, and the engine is shut off, operate the vehicle to rock the vehicle in one or more of: a forward/backward direction; a right/left direction; and an up/down direction.

According to an exemplary embodiment, the controller may be further configured to determine whether a time interval satisfies a time interval threshold, the time interval threshold being indicative of the tire pressure continuously satisfying the tire pressure threshold over time, and, when the time interval satisfies the time interval threshold, the distance satisfies the distance threshold, and the engine is shut off, operate the engine to turn on and operate the vehicle to move the distance.

According to an exemplary embodiment, the system may further comprise a humidity sensor and an air conditioning unit. The controller may be communicatively coupled to the humidity sensor and the air conditioning unit, and the controller may be configured to determine whether a humidity in the vehicle satisfies a humidity threshold based on the humidity sensor, the humidity threshold being indicative of an increase in the humidity in the vehicle; and, when the humidity in the vehicle satisfies the humidity threshold and the engine is shut off, operate the engine to turn on and run the air conditioning unit.

According to an exemplary embodiment, the system may further comprise a battery and a power sensor configured to measure a power of the batter. The controller may be communicatively coupled to the battery and the power sensor, and the controller may be further configured to determine whether the power of the battery satisfies a power threshold based on the power sensor, the power threshold being indicative of a decrease in the power of the battery, and, when the power of the battery satisfies the power threshold and the engine is shut off, operate the engine to turn on to recharge the battery.

According to an exemplary embodiment, the controller may be further configured to determine whether a clearance satisfies a clearance threshold based on the distance sensor, the clearance threshold being indicative of the vehicle having one or more of: lowered positions; and changed positions, and, when the clearance satisfies the clearance threshold, the distance satisfies the distance threshold, and the engine is shut off, operate the engine to turn on and operate the vehicle to move the distance.

According to an exemplary embodiment, the controller may be further configured to determine whether a clearance time interval satisfies a clearance time interval threshold, the clearance time interval threshold being indicative of the clearance continuously satisfying the clearance threshold over time, and, when the clearance time interval satisfies the clearance time interval threshold, the distance satisfies the distance threshold, and the engine is shut off, operate the engine to turn on and operate the vehicle to move the distance.

According to an exemplary embodiment, the distance sensor may be configured to measure a clearance between a bottom of the vehicle and a ground, and the distance sensor may comprise one or more of: a camera; a LIDAR system; and a RADAR system.

According to an object of the present disclosure, a system is provided. The system may comprise a non-transitory computer-readable storage medium, comprising a processor and a memory, configured to store programming instructions that, when executed by the processor, cause the processor to detect whether an engine is shut off, determine whether a tire pressure satisfies a tire pressure threshold based on a tire pressure sensor, the tire pressure threshold being indicative of a decreased in the tire pressure, determine whether a distance satisfies a distance threshold based on a distance sensor, the distance threshold being indicative of a vehicle having space to advance the distance in one or more of: a forward direction; and a backward direction, and, when the tire pressure satisfies the tire pressure threshold, the distance satisfies the distance threshold, and the engine is shut off, operate the engine to turn on and operate the vehicle to move the distance.

According to an exemplary embodiment, the programming instructions, when executed by the processor, may further cause the processor to, when the tire pressure satisfies the tire pressure threshold, the distance satisfies the distance threshold, and the engine is shut off, operate the vehicle to rock the vehicle in one or more of: a forward/backward direction; a right/left direction; and an up/down direction.

According to an exemplary embodiment, the programming instructions, when executed by the processor, may further cause the processor to determine whether a time interval satisfies a time interval threshold, the time interval threshold being indicative of the tire pressure continuously satisfying the tire pressure threshold over time, and, when the time interval satisfies the time interval threshold, the distance satisfies the distance threshold, and the engine is shut off, operate the engine to turn on and operate the vehicle to move the distance.

According to an exemplary embodiment, the programming instructions, when executed by the processor, may further cause the processor to determine whether a humidity in the vehicle satisfies a humidity threshold based on a humidity sensor, the humidity threshold being indicative of an increase in the humidity in the vehicle, and, when the humidity satisfies the humidity threshold and the engine is shut off, operate the engine to turn on and run an air conditioning unit.

According to an exemplary embodiment, the programming instructions, when executed by the processor, may further cause the processor to determine whether a power of a battery satisfies a power threshold in the battery based on a power sensor, the power threshold being indicative of a decrease in the power in the battery, and, when the power satisfies the power threshold and the engine is shut off, operate the engine to turn on to recharge the battery.

According to an exemplary embodiment, the programming instructions, when executed by the processor, may further cause the processor to determine whether a clearance satisfies a clearance threshold based on the distance sensor, the clearance threshold being indicative of the vehicle having one or more of: lowered positions; and changed positions, and, when the clearance satisfies the clearance threshold, the distance satisfies the distance threshold, and the engine is shut off, operate the engine to turn on and operate the vehicle to move the distance.

According to an exemplary embodiment, the programming instructions, when executed by the processor, may further cause the processor to determine whether a clearance time interval satisfies a clearance time interval threshold, the clearance time interval threshold being indicative of the clearance continuously satisfying the clearance threshold over time, and, when the clearance time interval satisfies the clearance time interval threshold, the distance satisfies the distance threshold, and the engine is shut off, operate the engine to turn on and operate the vehicle to move the distance.

According to an exemplary embodiment, the distance sensor may be configured to measure a clearance between a bottom of the vehicle and a ground, and the distance sensor may comprise one or more of: a camera; a LIDAR system; and a RADAR system.

According to an embodiment of the present disclosure, a system is provided. The system may comprise an engine configured to power a vehicle, a distance sensor configured to measure one or more distances surrounding the vehicle, a tire pressure sensor configured to sense a tire pressure of one or more tires of the vehicle, and a controller, communicatively coupled to the engine, the distance sensor, and the tire pressure sensor. The controller may be configured to detect whether the engine is shut off, determine whether a time interval satisfies a time interval threshold, the time interval being indicative of a time duration for the vehicle sitting idle, determine whether a distance satisfies a distance threshold based on the distance sensor, the distance threshold being indicative of the vehicle having space to advance the distance in one or more of: a forward direction; and a backward direction, and, when the time interval satisfies the time interval threshold, the distance satisfies the distance threshold, and the engine is shut off, operate the engine to turn on and operate the vehicle to move the distance.

According to an exemplary embodiment, the system may further comprise a humidity sensor and an air conditioning unit. The controller may be communicatively coupled to the humidity sensor and the air conditioning unit, and the controller may be further configured to determine whether a humidity in the vehicle satisfies a humidity threshold based on the humidity sensor, the humidity threshold being indicative of an increase in the humidity in the vehicle, and, when the time interval satisfies the time interval threshold, the humidity in the vehicle satisfies the humidity threshold, and the engine is shut off, operate the engine to turn on and run the air conditioning unit.

According to an exemplary embodiment, the system may further comprise a battery and a power sensor configured to measure a power of the battery. The controller may be communicatively coupled to the battery and the power sensor, and the controller may be further configured to, determine whether the power of the battery satisfies a power threshold based on the power sensor, the power threshold being indicative of a decrease of the power in the battery, and, when the time interval satisfies the time interval threshold, the power of the battery satisfies the power threshold, and the engine is shut off, operate the engine to turn on to recharge the battery.

According to an exemplary embodiment, the controller may be further configured to determine whether a clearance satisfies a clearance threshold based on the distance sensor, the clearance threshold being indicative of the vehicle having one or more of: lowered positions; and changed positions, and, when the time interval satisfies the time interval threshold, the clearance satisfies the clearance threshold, the distance satisfies the distance threshold, and the engine is shut off, operate the engine to turn on and operate the vehicle to move the distance.

In additional aspects, vehicles are provided that comprise a system as disclosed herein.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
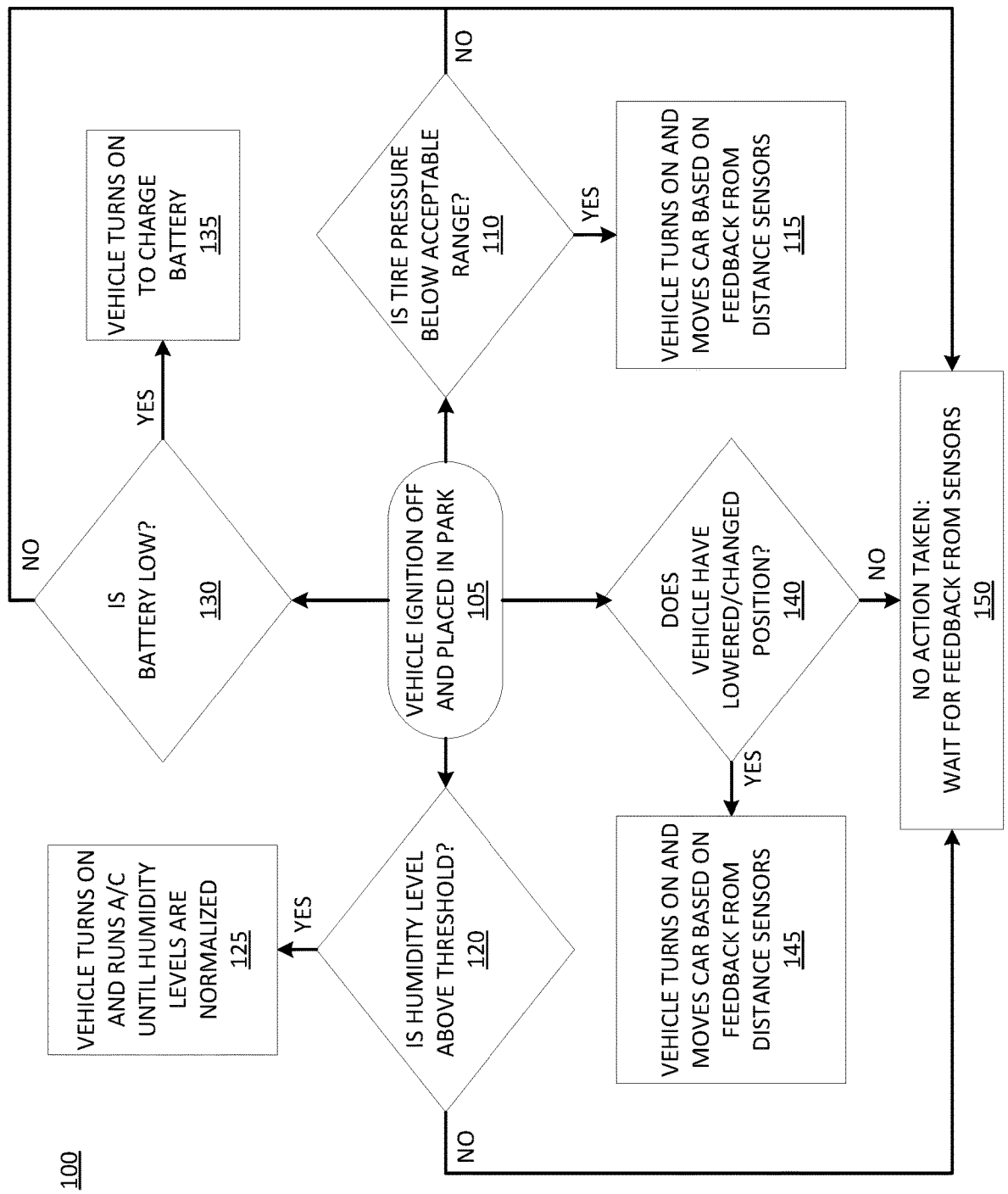
FIG. 1 illustrates a method for providing preventative vehicle maintenance, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Referring now to FIG. 1, a method 100 for providing preventative vehicle maintenance is illustratively depicted, in accordance with an exemplary embodiment of the present disclosure.

According to an exemplary embodiment, the method(s) of the present disclosure are configured to provide preventative measures in order to aid in preventing damage, wear, and/or other issues that may arise from vehicles remaining parked and/or unused for long periods of time.

According to an exemplary embodiment, a vehicle of the present disclosure may comprise an engine configured to power the vehicle, one or more distance sensors configured to measure one or more distances surrounding the vehicle, a tire pressure sensor configured to sense a tire pressure of one or more tires of the vehicle, a humidity sensor configured to sense a humidity in the vehicle, a temperature control system (e.g., an air conditioning (A/C) system and/or a heating system), a battery, a power sensor configured to measure a power of the battery, one or more advanced driver assistance systems (ADASs), a controller, and/or one or more other suitable components. According to an exemplary embodiment, the controller may be communicatively coupled to the engine, the one or more distance sensors, the tire pressure sensor, the humidity sensor, the temperature control system, the battery, the power sensor, the ADAS, and/or other suitable components. According to an exemplary embodiment, the one or more distance sensors may comprise one or more cameras, one or more LiDAR systems, one or more RADAR systems, and/or one or more other suitable distance sensors.

Figure 3:
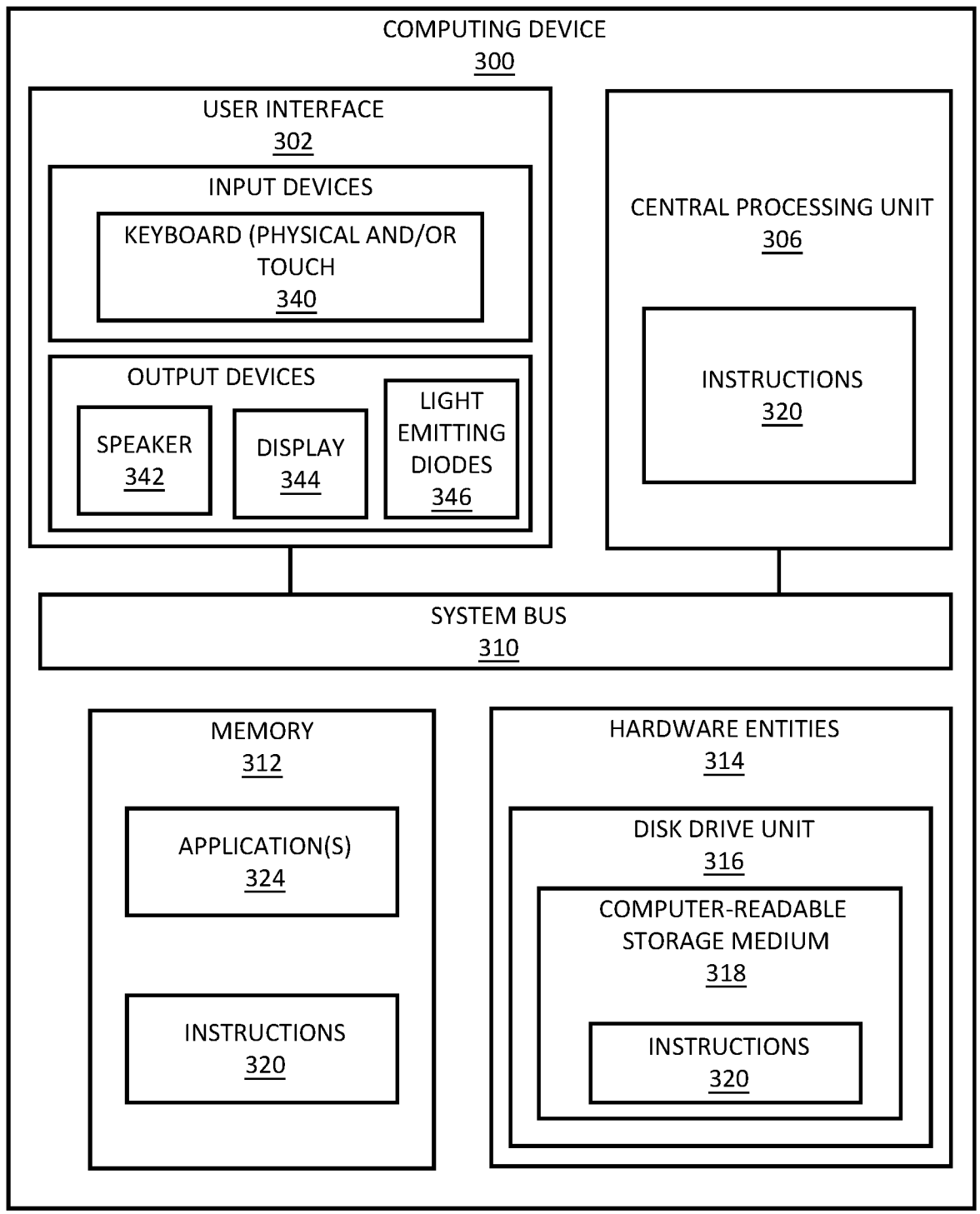
FIG. 3 illustrates example elements of a computing device, according to an exemplary embodiment of the present disclosure.

According to an exemplary embodiment, one or more of the components of the vehicle may comprise, or be a component of, a computing device (e.g., a non-transitory computer-readable storage medium), such as, e.g., computing device 300 as shown in FIG. 3. The computing device may comprise a processor and a memory and be configured to store programming instructions that, when executed by the processor, may cause the processor to perform one or more of the steps of the present disclosure (e.g., the steps in method 100 of FIG. 1).

At 105, the controller may detect that an engine of the vehicle is shut off (e.g., the vehicle ignition is off and the vehicle is set/placed in park).

At 110, the tire pressure sensor detects a tire pressure of the one or more tires of the vehicle and the controller determines whether the tire pressure satisfies a tire pressure threshold. According to an exemplary embodiment, the tire pressure threshold is indicative of a decrease in the tire pressure. If the tire pressure is below the tire pressure threshold, then the tire pressure satisfies the tire pressure threshold, the tire pressure is below an acceptable range and/or one or more flat spots may have formed on the one or more tires, and, at 115, the controller operates the engine in order to turn on and operate the vehicle, causing the vehicle to move, based on feedback from the one or more distance sensors.

According to an exemplary embodiment, operating the engine in order to turn on and operate the vehicle, causing the vehicle to move, may comprise measuring a distance, using the one or more distance sensors, and determining whether a distance satisfies a distance threshold based on the distance sensor, the distance threshold being indicative of the vehicle having space to advance the distance. When the distance is above the distance threshold, the vehicle has the space to advance the distance in one or more directions. The distance may be of suitable length (e.g., inches, feet, etc.). The vehicle movement may be in a rocking or other suitable motion and may be in a forward direction, a backward direction, a right direction, a left direction, an up direction, a down direction, and/or in any other suitable direction. According to an exemplary embodiment, the controller may be configured to cause the brakes of the vehicle to be used in order to aid in the prevention of rust buildup along the brakes.

If the tire pressure is above the tire pressure threshold, then the tire pressure does not satisfy the tire pressure threshold, the tire pressure is equal or above an acceptable range, and, at 150, no action occurs and the controller awaits feedback from the sensors.

At 120, the humidity sensor detects a humidity of the vehicle and the controller determines whether the humidity of the vehicle satisfies a humidity threshold. The humidity threshold is indicative of an increase in the humidity in the vehicle. When the humidity of the vehicle is above the humidity threshold, then the humidity of the vehicle satisfies the humidity threshold and, at 125, the controller operates the engine in order to turn on and run the temperature control system (e.g., the A/C system). According to an exemplary embodiment, the temperature control system is run until the humidity of the vehicle is below the humidity threshold. For vehicles that remain in park or are unused for long periods of time, increased humidity can lead to mold growth If the humidity of the vehicle is below the humidity threshold, then the humidity of the vehicle does not satisfy the humidity threshold and, at 150, no action occurs and the controller awaits feedback from the sensors.

At 130, the power sensor measures a power of the battery and the controller determines whether the power of the battery satisfies a power threshold. The power threshold is indicative of a decrease in the power of the battery. When the power of the battery is below the power threshold, then the power of the battery satisfies the power threshold, the power of the battery is low, and, at 135, the controller operates the engine, causing the engine to turn on, resulting in the engine charging the battery.

If the power of the battery is above the power threshold, then the power of the battery does not satisfy the power threshold and, at 150, no action occurs and the controller awaits feedback from the sensors.

At 140, via the one or more distance sensors (e.g., one or more cameras, ADAS sensors, LiDAR systems, RADAR systems, etc.) a clearance (e.g., a distance) between the vehicle and one or more objects is measured and the controller determines whether the clearance satisfies a clearance threshold. The clearance threshold is indicative of the vehicle having one or more lowered positions and/or changed positions. According to an exemplary embodiment, the one or more distance sensors are configured to measure a clearance between a bottom of the vehicle and a ground, between the vehicle and an object, etc. It is noted, however, that other measurements may be measured, while maintaining the spirit and functionality of the present disclosure. A lowering of the vehicle may be indicative of the vehicle developing one or more flat spots on the one or more tires.

When the clearance is below the clearance threshold, the clearance satisfies the clearance threshold and, at 145, the controller operates the engine in order to turn on and operate the vehicle, causing the vehicle to move, based on feedback from the one or more distance sensors.

According to an exemplary embodiment, operating the engine in order to turn on and operate the vehicle, causing the vehicle to move, may comprise measuring a distance, using the one or more distance sensors, and determining whether a distance satisfies a distance threshold based on the distance sensor, the distance threshold being indicative of the vehicle having space to advance the distance. When the distance is above the distance threshold, the vehicle has the space to advance the distance in one or more directions. The distance may be of suitable length (e.g., inches, feet, etc.). The vehicle movement may be in a rocking or other suitable motion and may be in a forward direction, a backward direction, a right direction, a left direction, an up direction, a down direction, (e.g., via one or more suspension lift apparatuses), and/or in any other suitable direction.

Figure 2:
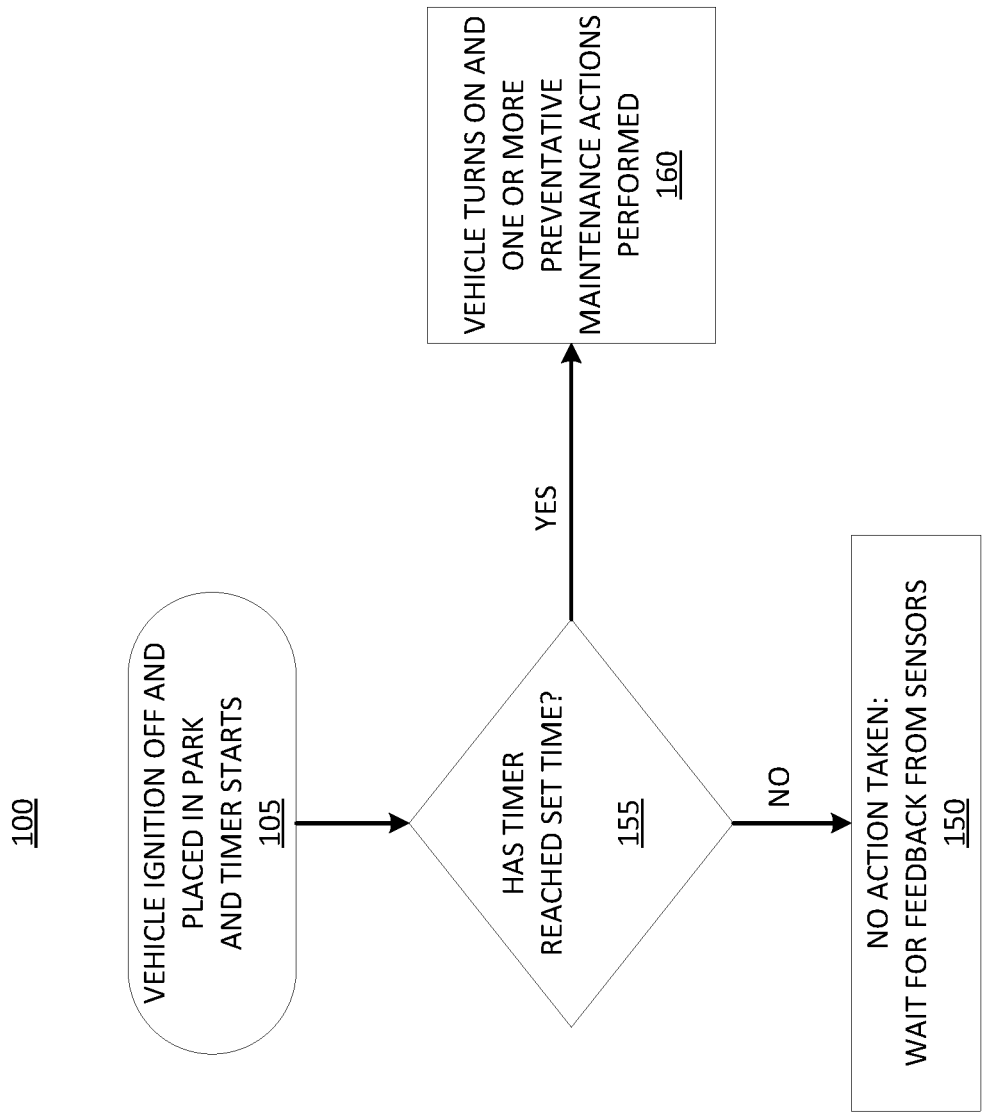
FIG. 2 illustrates a method for providing preventative vehicle maintenance, according to an exemplary embodiment of the present disclosure.

According to an exemplary embodiment, as shown in FIG. 2, at 105, when the controller detects that the engine of the vehicle is shut off (e.g., the vehicle ignition is off and the vehicle is set/placed in park), the controller may set a timer. After a time has passed, the controller, at 155, determines whether the time satisfies a time interval threshold. The time interval threshold may be indicative of the need or recommendation that one or more preventative maintenance actions should be performed. If the time interval threshold is satisfied, then, at 160, the controller operates the engine, causing the engine to turn on, resulting in one or more preventative maintenance actions to be performed.

By way of example, the time interval threshold may be indicative of the tire pressure continuously satisfying the tire pressure threshold and, when the time exceeds the time interval threshold, then the time interval threshold is satisfied and, at 160, the controller operates the engine in order to turn on and operate the vehicle, causing the vehicle to move, based on feedback from the one or more distance sensors. According to an exemplary embodiment, the controller may be configured to cause the brakes of the vehicle to be used in order to aid in the prevention of rust buildup along the brakes.

By way of example, the time interval threshold may be indicative of a time that has passed which increases the likelihood of an increase in the humidity in the vehicle and, when the time exceeds the time interval threshold, then the time interval threshold is satisfied and, at 160, the controller operates the engine in order to turn on and run the temperature control system (e.g., the A/C system).

By way of example, the time interval threshold may be indicative of a time at which the power of the battery may be below the power threshold and, when the time exceeds the time interval threshold, then the time interval threshold is satisfied and, at 160, the controller operates the engine, causing the engine to turn on, resulting in the engine charging the battery.

By way of example, the time interval threshold (e.g., a clearance time interval threshold) may be indicative of the clearance continuously satisfying the clearance threshold over time and, when the time exceeds the time interval threshold, then the time interval threshold is satisfied and, at 160, the controller operates the engine in order to turn on and operate the vehicle, causing the vehicle to move, based on feedback from the one or more distance sensors. According to an exemplary embodiment, the controller may be configured to cause the brakes of the vehicle to be used in order to aid in the prevention of rust buildup along the brakes.

Referring now to FIG. 3, an illustration of an example architecture for a computing device 300 is provided.

The hardware architecture of FIG. 3 represents one example implementation of a representative computing device configured to one or more methods and means for providing preventative maintenance on a vehicle, as described herein. As such, the computing device 300 of FIG. 3 may be configured to implement at least a portion of the method(s) described herein (for example, method 100 of FIGS. 1-2).

Some or all components of the computing device 300 may be implemented as hardware, software and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to and/or programmed to perform one or more of the methodologies, procedures, or functions described herein.

As shown in FIG. 3, the computing device 300 may comprise a user interface 302, a Central Processing Unit ("CPU") 306, a system bus 310, a memory 312 connected to and accessible by other portions of computing device 400 through system bus 310, and hardware entities 314 connected to system bus 310. The user interface may comprise input devices and output devices, which may be configured to facilitate user-software interactions for controlling operations of the computing device 300. The input devices may comprise, but are not limited to, a physical and/or touch keyboard 350. The input devices may be connected to the computing device 300 via a wired or wireless connection (e.g., a Bluetooth® connection). The output devices may comprise, but are not limited to, a speaker 352, a display 354, and/or one or more light emitting diodes 356.

At least some of the hardware entities 314 may be configured to perform actions involving access to and use of memory 312, which may be a Random Access Memory (RAM), a disk driver and/or a Compact Disc Read Only Memory (CD-ROM), among other suitable memory types. Hardware entities 314 may comprise a disk drive unit 316 comprising a computer-readable storage medium 318 on which is stored one or more sets of instructions 320 (e.g., programming instructions such as, but not limited to, software code) configured to implement one or more of the methodologies, procedures, or functions described herein. The instructions 320 may also reside, completely or at least partially, within the memory 312 and/or within the CPU 306 during execution thereof by the computing device 300. The memory 312 and the CPU 306 also may constitute machine-readable media. The term "machine-readable media", as used here, may refer to a single medium or multiple media (e.g., a centralized or distributed database, and/or associated caches and servers) that store the one or more sets of instructions 320. The term "machine-readable media", as used here, also may refer to any medium that is capable of storing, encoding or carrying a set of instructions 320 for execution by the computing device 400 and that cause the computing device 400 to perform any one or more of the methodologies of the present disclosure.

Figure 4:
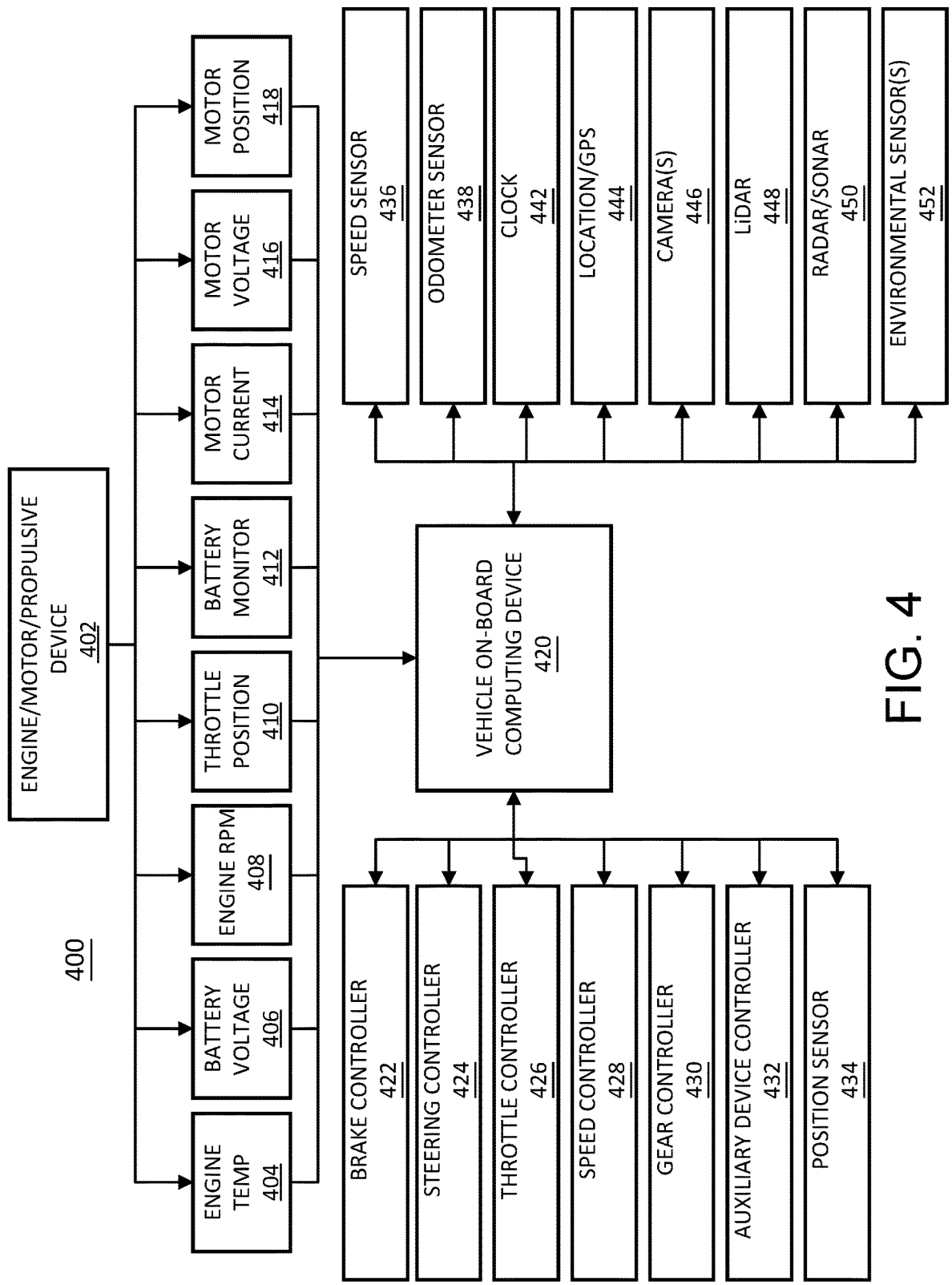
FIG. 4 illustrates an example architecture of a vehicle, according to an exemplary embodiment of the present disclosure.

Referring now to FIG. 4, an example vehicle system architecture 400 for a vehicle is provided, in accordance with an exemplary embodiment of the present disclosure.

As shown in FIG. 4, the vehicle system architecture 400 may comprise an engine, motor or propulsive device (e.g. a thruster) 402 and various sensors 404-418 for measuring various parameters of the vehicle system architecture 400. In gas-powered or hybrid vehicles having a fuel-powered engine, the sensors 404-418 may comprise, for example, an engine temperature sensor 404, a battery voltage sensor 406, an engine Rotations Per Minute (RPM) sensor 408, and/or a throttle position sensor 410. If the vehicle is an electric or hybrid vehicle, then the vehicle may comprise an electric motor, and accordingly may comprise sensors such as a battery monitoring system 412 (to measure current, voltage and/or temperature of the battery), motor current 414 and voltage 416 sensors, and motor position sensors such as resolvers and encoders 418.

Operational parameter sensors that are common to both types of vehicles may comprise, for example: a position sensor 434 such as an accelerometer, gyroscope and/or inertial measurement unit; a speed sensor 436; and/or an odometer sensor 438. The vehicle system architecture 400 also may comprise a clock 442 that the system uses to determine vehicle time during operation. The clock 442 may be encoded into the vehicle on-board computing device 420, it may be a separate device, or multiple clocks may be available.

The vehicle system architecture 400 also may comprise various sensors that operate to gather information about the environment in which the vehicle is traveling. These sensors may comprise, for example: a location sensor 444 (for example, a Global Positioning System (GPS) device); object detection sensors such as one or more cameras 446; a LIDAR sensor system 448, and/or a RADAR and/or a sonar system 450. The sensors also may comprise environmental sensors 452 such as, e.g., a humidity sensor, a precipitation sensor, and/or ambient temperature sensor. The object detection sensors may be configured to enable the vehicle system architecture 400 to detect objects that are within a given distance range of the vehicle in any direction, while the environmental sensors 452 may be configured to collect data about environmental conditions within the vehicle's area of travel.

During operations, information may be communicated from the sensors to an on-board computing device 420 (e.g., computing device 300 of FIG. 3). The on-board computing device 420 may be configured to analyze the data captured by the sensors and/or data received from data providers and may be configured to optionally control operations of the vehicle system architecture 400 based on results of the analysis. For example, the on-board computing device 420 may be configured to control: braking via a brake controller 422; direction via a steering controller 424; speed and acceleration via a throttle controller 426 (in a gas-powered vehicle) or a motor speed controller 428 (such as a current level controller in an electric vehicle); a differential gear controller 430 (in vehicles with transmissions); and/or other controllers.

Geographic location information may be communicated from the location sensor 444 to the on-board computing device 420, which may then access a map of the environment that corresponds to the location information to determine known fixed features of the environment such as streets, buildings, stop signs and/or stop/go signals. Captured images from the cameras 446 and/or object detection information captured from sensors such as LiDAR 448 may be communicated from those sensors to the on-board computing device 420. The object detection information and/or captured images may be processed by the on-board computing device 420 to detect objects in proximity to the vehicle. Any known or to be known technique for making an object detection based on sensor data and/or captured images may be used in the embodiments disclosed in this document.

The above description is merely illustrative of the technical spirit of the present disclosure, and those skilled in the art to which the present disclosure belongs may make various modifications and changes without departing from the essential features of the present disclosure.

Although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. A system comprising:
an engine configured to power a vehicle;
a distance sensor configured to measure one or more distances surrounding the vehicle;
a tire pressure sensor configured to sense a tire pressure of one or more tires of the vehicle; and
a controller, communicatively coupled to the engine, the distance sensor, and the tire pressure sensor, wherein the controller is configured to:
detect whether the engine is shut off;
determine whether the tire pressure satisfies a tire pressure threshold based on the tire pressure sensor, the tire pressure threshold being indicative of a decrease in the tire pressure;
determine whether a distance satisfies a distance threshold based on the distance sensor, the distance threshold being indicative of the vehicle having space to advance the distance in one or more of: a forward direction; and a backward direction; and
when the tire pressure satisfies the tire pressure threshold, the distance satisfies the distance threshold, and the engine is shut off, operate the engine to turn on and operate the vehicle to move the distance.

2. The system of claim 1, wherein the controller is further configured to:
when the tire pressure satisfies the tire pressure threshold, the distance satisfies the distance threshold, and the engine is shut off, operate the vehicle to rock the vehicle in one or more of:
a forward/backward direction;
a right/left direction; and
an up/down direction.

3. The system of claim 1, wherein the controller is further configured to:
determine whether a time interval satisfies a time interval threshold, the time interval threshold being indicative of the tire pressure continuously satisfying the tire pressure threshold over time; and
when the time interval satisfies the time interval threshold, the distance satisfies the distance threshold, and the engine is shut off, operate the engine to turn on and operate the vehicle to move the distance.

4. The system of claim 1, further comprising:
a humidity sensor; and
an air conditioning unit,
wherein:
the controller is communicatively coupled to the humidity sensor and the air conditioning unit, and
the controller is further configured to:
determine whether a humidity in the vehicle satisfies a humidity threshold based on the humidity sensor, the humidity threshold being indicative of an increase in the humidity in the vehicle; and
when the humidity in the vehicle satisfies the humidity threshold and the engine is shut off, operate the engine to turn on and run the air conditioning unit.

5. The system of claim 1, the system further comprising:
a battery; and
a power sensor configured to measure a power of the battery,
wherein:
the controller is communicatively coupled to the battery and the power sensor, and
the controller is further configured to:
determine whether the power of the battery satisfies a power threshold based on the power sensor, the power threshold being indicative of a decrease in the power of the battery; and
when the power of the battery satisfies the power threshold and the engine is shut off, operate the engine to turn on to recharge the battery.

6. The system of claim 1, wherein the controller is further configured to:
determine whether a clearance satisfies a clearance threshold based on the distance sensor, the clearance threshold being indicative of the vehicle having one or more of: lowered positions; and changed positions; and
when the clearance satisfies the clearance threshold, the distance satisfies the distance threshold, and the engine is shut off, operate the engine to turn on and operate the vehicle to move the distance.

7. The system of claim 6, wherein the controller is further configured to:
determine whether a clearance time interval satisfies a clearance time interval threshold, the clearance time interval threshold being indicative of the clearance continuously satisfying the clearance threshold over time; and
when the clearance time interval satisfies the clearance time interval threshold, the distance satisfies the distance threshold, and the engine is shut off, operate the engine to turn on and operate the vehicle to move the distance.

8. The system of claim 1, wherein:
the distance sensor is configured to measure a clearance between a bottom of the vehicle and a ground, and
the distance sensor comprises one or more of: a camera; a LIDAR system; and a RADAR system.

9. A system, comprising:
a non-transitory computer-readable storage medium, comprising a processor and a memory, configured to store programming instructions that, when executed by the processor, cause the processor to:
detect whether an engine is shut off;

determine whether a tire pressure satisfies a tire pressure threshold based on a tire pressure sensor, the tire pressure threshold being indicative of a decreased in the tire pressure;
determine whether a distance satisfies a distance threshold based on a distance sensor, the distance threshold being indicative of a vehicle having space to advance the distance in one or more of: a forward direction; and a backward direction; and
when the tire pressure satisfies the tire pressure threshold, the distance satisfies the distance threshold, and the engine is shut off, operate the engine to turn on and operate the vehicle to move the distance.

10. The system of claim 9, wherein the programming instructions, when executed by the processor, further cause the processor to:
when the tire pressure satisfies the tire pressure threshold, the distance satisfies the distance threshold, and the engine is shut off, operate the vehicle to rock the vehicle in one or more of:
a forward/backward direction;
a right/left direction; and
an up/down direction.

11. The system of claim 9, wherein the programming instructions, when executed by the processor, further cause the processor to:
determine whether a time interval satisfies a time interval threshold, the time interval threshold being indicative of the tire pressure continuously satisfying the tire pressure threshold over time; and
when the time interval satisfies the time interval threshold, the distance satisfies the distance threshold, and the engine is shut off, operate the engine to turn on and operate the vehicle to move the distance.

12. The system of claim 9, wherein the programming instructions, when executed by the processor, further cause the processor to:
determine whether a humidity in the vehicle satisfies a humidity threshold based on a humidity sensor, the humidity threshold being indicative of an increase in the humidity in the vehicle; and
when the humidity satisfies the humidity threshold and the engine is shut off, operate the engine to turn on and run an air conditioning unit.

13. The system of claim 9, wherein the programming instructions, when executed by the processor, further cause the processor to:
determine whether a power of a battery satisfies a power threshold in the battery based on a power sensor, the power threshold being indicative of a decrease in the power in the battery; and
when the power satisfies the power threshold and the engine is shut off, operate the engine to turn on to recharge the battery.

14. The system of claim 9, wherein the programming instructions, when executed by the processor, further cause the processor to:
determine whether a clearance satisfies a clearance threshold based on the distance sensor, the clearance threshold being indicative of the vehicle having one or more of: lowered positions; and changed positions; and
when the clearance satisfies the clearance threshold, the distance satisfies the distance threshold, and the engine is shut off, operate the engine to turn on and operate the vehicle to move the distance.

15. The system of claim 14, wherein the programming instructions, when executed by the processor, further cause the processor to:
determine whether a clearance time interval satisfies a clearance time interval threshold, the clearance time interval threshold being indicative of the clearance continuously satisfying the clearance threshold over time; and
when the clearance time interval satisfies the clearance time interval threshold, the distance satisfies the distance threshold, and the engine is shut off, operate the engine to turn on and operate the vehicle to move the distance.

16. A system comprising:
an engine configured to power a vehicle;
a distance sensor configured to measure one or more distances surrounding the vehicle;
a tire pressure sensor configured to sense a tire pressure of one or more tires of the vehicle; and
a controller, communicatively coupled to the engine, the distance sensor, and the tire pressure sensor, wherein the controller is configured to:
detect whether the engine is shut off;
determine whether a time interval satisfies a time interval threshold, the time interval being indicative of a time duration for the vehicle sitting idle;
determine whether a distance satisfies a distance threshold based on the distance sensor, the distance threshold being indicative of the vehicle having space to advance the distance in one or more of: a forward direction; and a backward direction; and
when the time interval satisfies the time interval threshold, the distance satisfies the distance threshold, and the engine is shut off, operate the engine to turn on and operate the vehicle to move the distance.

17. The system of claim 16, further comprising:
a humidity sensor; and
an air conditioning unit,
wherein:
the controller is communicatively coupled to the humidity sensor and the air conditioning unit, and
the controller is further configured to:
determine whether a humidity in the vehicle satisfies a humidity threshold based on the humidity sensor, the humidity threshold being indicative of an increase in the humidity in the vehicle; and
when the time interval satisfies the time interval threshold, the humidity in the vehicle satisfies the humidity threshold, and the engine is shut off, operate the engine to turn on and run the air conditioning unit.

18. The system of claim 1, further comprising:
a battery; and
a power sensor configured to measure a power of the battery,
wherein:
the controller is communicatively coupled to the battery and the power sensor, and
the controller is further configured to:
determine whether the power of the battery satisfies a power threshold based on the power sensor, the power threshold being indicative of a decrease of the power in the battery; and
when the time interval satisfies the time interval threshold, the power of the battery satisfies the power threshold, and the engine is shut off, operate the engine to turn on to recharge the battery.

19. The system of claim 16, wherein the controller is further configured to:
- determine whether a clearance satisfies a clearance threshold based on the distance sensor, the clearance threshold being indicative of the vehicle having one or more of: lowered positions; and changed positions; and
- when the time interval satisfies the time interval threshold, the clearance satisfies the clearance threshold, the distance satisfies the distance threshold, and the engine is shut off, operate the engine to turn on and operate the vehicle to move the distance.

20. A vehicle comprising the system of claim 1.

* * * * *